United States Patent
Nakano et al.

(10) Patent No.: US 8,904,437 B2
(45) Date of Patent: Dec. 2, 2014

(54) SIMILAR CONTENT SEARCH DEVICE AND COMPUTER-READABLE STORAGE MEDIUM

(75) Inventors: Wataru Nakano, Kawasaki (JP); Masaru Suzuki, Kawasaki (JP); Masayuki Okamoto, Kawasaki (JP); Tomohiro Yamasaki, Tokyo (JP); Isao Mihara, Tokyo (JP); Masahiro Sekine, Tokyo (JP); Junya Takakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 13/423,002

(22) Filed: Mar. 16, 2012

(65) Prior Publication Data

US 2012/0266195 A1  Oct. 18, 2012

Related U.S. Application Data

(63) Continuation of application No. PCT/JP2009/067345, filed on Oct. 5, 2009.

(51) Int. Cl.
G06F 3/00 (2006.01)
G06F 13/00 (2006.01)
H04N 5/445 (2011.01)
G06F 17/30 (2006.01)

(52) U.S. Cl.
CPC ................ *G06F 17/30722* (2013.01)
USPC ............................ 725/40; 725/53

(58) Field of Classification Search
None
See application file for complete search history.

(56) References Cited

U.S. PATENT DOCUMENTS

| | | | |
|---|---|---|---|
| 7,053,290 B2 | 5/2006 | Tagawa et al. | |
| 8,041,155 B2 | 10/2011 | Mihara et al. | |
| 2004/0260539 A1 | 12/2004 | Tagawa et al. | |
| 2005/0086692 A1* | 4/2005 | Dudkiewicz et al. | 725/46 |
| 2005/0155062 A1* | 7/2005 | Hiltunen | 725/46 |
| 2005/0172318 A1* | 8/2005 | Dudkiewicz et al. | 725/46 |
| 2008/0086754 A1* | 4/2008 | Chen et al. | 725/105 |
| 2008/0155602 A1* | 6/2008 | Collet et al. | 725/46 |
| 2008/0189367 A1 | 8/2008 | Okumura | |
| 2009/0006350 A1 | 1/2009 | Narahara et al. | |
| 2010/0127974 A1 | 5/2010 | Horiuchi et al. | |
| 2011/0252447 A1 | 10/2011 | Suzuki et al. | |

FOREIGN PATENT DOCUMENTS

| | | |
|---|---|---|
| CN | 101321266 A | 12/2008 |
| JP | 07-078182 | 3/1995 |
| JP | 11-7453 A | 1/1999 |
| JP | 11-259515 | 9/1999 |

(Continued)

OTHER PUBLICATIONS

Chinese Office Action issued Mar. 5, 2013 in Patent Application No. 200980161698.2 with English Translation.

(Continued)

*Primary Examiner* — Ricky Chin
(74) *Attorney, Agent, or Firm* — Oblon, Spivak, McClelland, Maier & Neustadt, L.L.P.

(57) ABSTRACT

According to one embodiment, a phrase similarity is reduced when a common genre characteristic word is included in a program of interest interested by a user and a similar phrase program including the same phrase. A genre similarity is increased when a common genre characteristic word is included in the program of interest and a similar genre program including the same genre as the program of interest. The similar phrase program is presented based on the phrase similarity, and the similar genre program is presented based on the genre similarity.

9 Claims, 16 Drawing Sheets

(56) References Cited

FOREIGN PATENT DOCUMENTS

| | | |
|---|---|---|
| JP | 3569441 | 6/2004 |
| JP | 2004-220513 | 8/2004 |
| JP | 2005-32409 A | 2/2005 |
| JP | 2005-135311 A | 5/2005 |
| JP | 2006-338315 | 12/2006 |
| JP | 2007-006095 | 1/2007 |
| JP | 2007-079948 | 3/2007 |
| JP | 2008-191748 | 8/2008 |
| JP | 2008-306458 | 12/2008 |
| JP | 2009-080580 | 4/2009 |
| JP | 2009-116593 | 5/2009 |
| WO | WO 2008/107986 A1 | 9/2008 |

OTHER PUBLICATIONS

International Preliminary Report on Patentability and Written Opinion issued May 8, 2012 in PCT/JP2009/067345 filed on Oct. 5, 2009 (English translation only).
Office Action issued Apr. 9, 2013 in Japanese Patent Application No. 2011-535223 with English language translation.
Office Action issued Jul. 5, 2013 in Japanese Patent Application No. 2011-535223 with English language translation.
International Search Report issued Nov. 2, 2009 for corresponding Application PCT/JP09/67345, filed Oct. 5, 2009.
Office Action issued Mar. 21, 2014 in Chinese Application No. 200980161698.2 (With English Translation).
Office Action issued Oct. 8, 2013 in Chinese Patent Application No. 200980161698.2 (with English language translation).

* cited by examiner

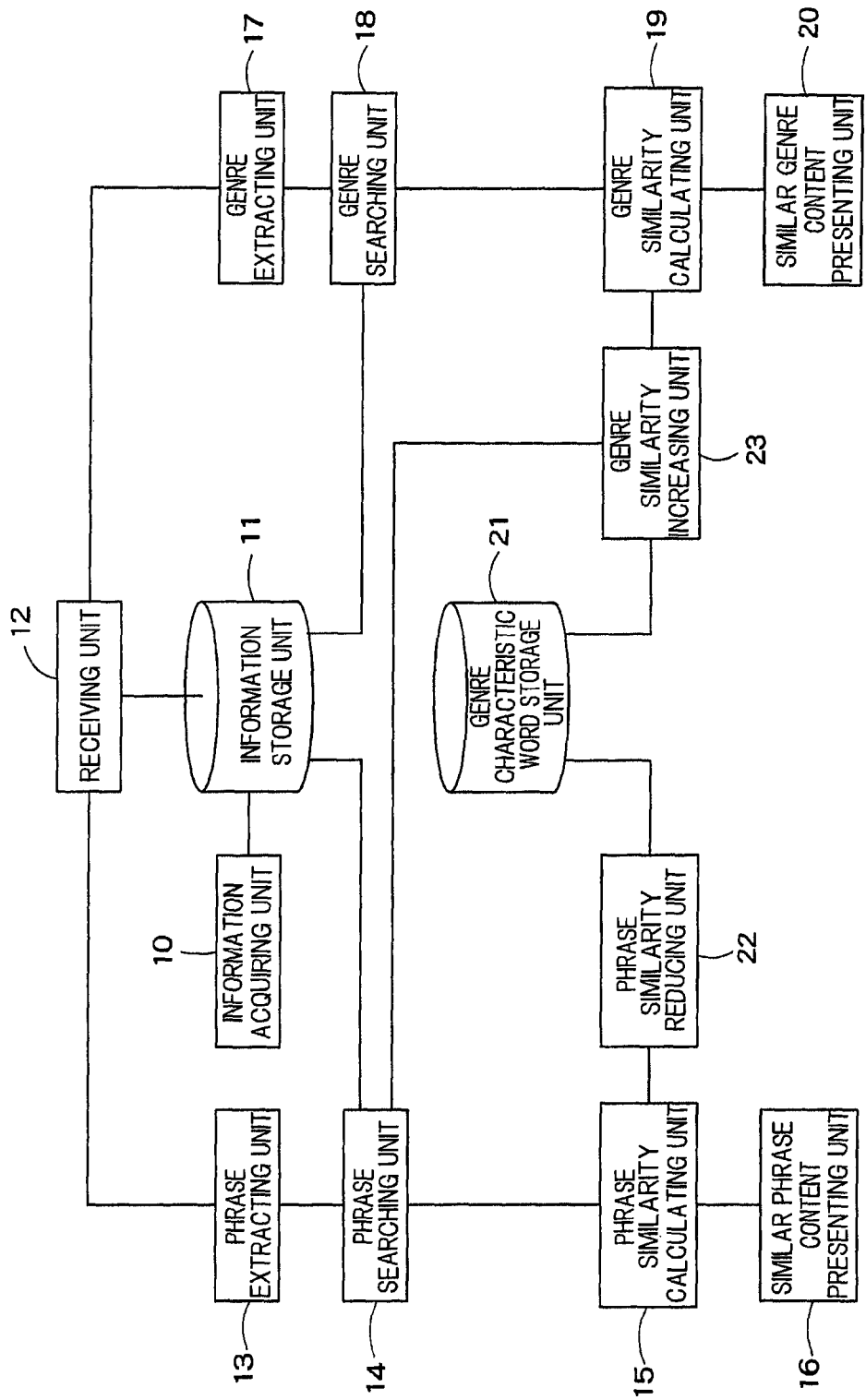
F I G. 1

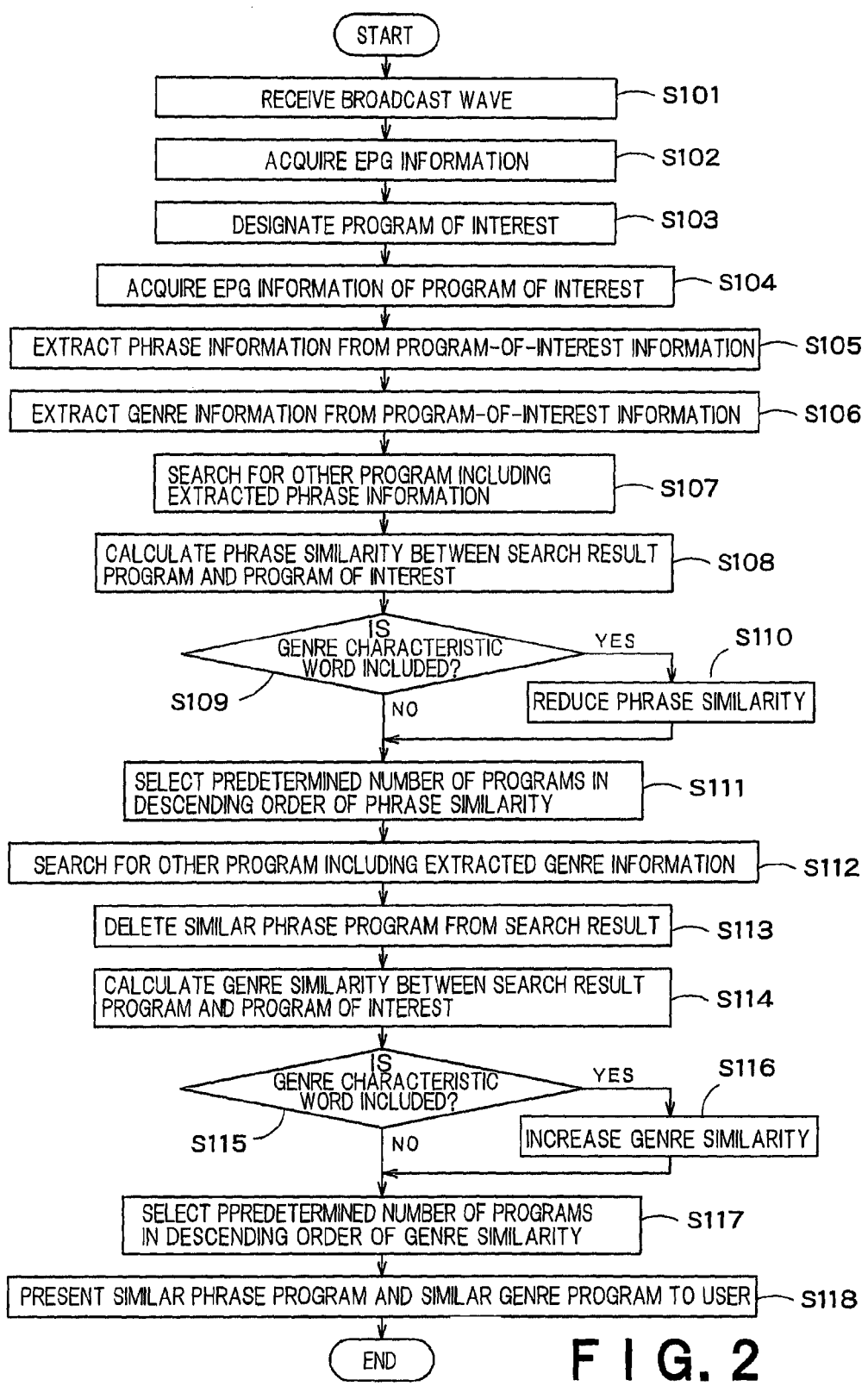
F I G. 2

| ID | BROADCAST STATION | PROGRAM TITLE | GENRE CODE 1 | GENRE CODE 2 | GENRE CODE 3 | PROGRAM OVERVIEW INFORMATION | START DATE AND TIME | END DATE AND TIME |
|---|---|---|---|---|---|---|---|---|
| 10000001 | TELEVISION ABC | CLASSIC SPECIAL "BEETHOVEN'S SYMPHONY..." | 0405 | 0402 | - | FORMS OF DOMESTIC PERFORMERS... | 2009/9/9 10:00 | 2009/9/9 11:00 |
| 10000002 | XYZ BROADCASTING | MUSICIAN BIOGRAHY "MUSICIANS OF GERMANY..." | 0801 | 0402 | - | ABOUT CLASSIC COMPOSERS OF GERMANY | 2009/9/9 20:00 | 2009/9/9 21:00 |
| 10000003 | ○○ CHANNEL | EUROPE TRAVEL, BELLIN IN GERMANY.. | 0a00 | - | - | VISITING BERLIN, CAPITAL OF GERMANY... | 2009/9/9 19:00 | 2009/9/9 20:00 |
| ... | ... | ... | ... | ... | ... | ... | ... | ... |

F I G. 3

| | TELEVISION ABC | XYZ BROADCASTING | ○○ CHANNEL | ⋮ |
|---|---|---|---|---|
| 10 | CLASSIC SPECIAL ⌈ … ⇦ P | WIDESHOW | FILM FESTIVAL, NOMINATED FILMS SPECIAL 1″ … | |
| 11 | PLAY/MUSICAL ⌈ … | INFORMATION VARIETY | | |
| 12 | DAYTAME NEWS. INFORMATION. WIDESHOW | DAYTIME DRAMA ″ ″ EPISODE 3 | FILM FESTIVAL, NOMINATED FILMS SPECIAL 2″ … | ⋮ |
| 13 | | DRAMA SPECIAL ″ … | | |
| 14 | HOMETOWN NEWS | U.S. OPEN TENNIS TOURNAMENT— SEMIFINAL | AWARDS CEREMONY RELAY | |

W

F I G. 4

| PROGRAM ID | CHARACTER STRING | SEMANTIC INFORMATION/ WORD CLASS INFORMATION | EXTRACTION SOURCE | APPEARANCE FREQUENCY |
|---|---|---|---|---|
| 10000001 | CLASSIC | MUSIC | TITLE | 1 |
| 10000001 | SYMPHONY | MUSIC | TITLE | 2 |
| 10000001 | CONCERT | noun | OVERVIEW | 1 |
| 10000002 | GERMANY | COUNTRY | BOTH | 2 |
| 10000002 | MUSICIAN | VOCATION | TITLE | 1 |
| 10000002 | COMPOSER | VOCATION | OVERVIEW | 1 |
| 10000003 | EUROPE | AREA | TITLE | 1 |
| ... | ... | ... | ... | ... |

F I G. 5

| GENRE CODE | LARGE GENRE CHARACTER STRING | SMALL GENRE CHARACTER STRING |
|---|---|---|
| 0000 | NEWS·REPORT | HOURLY·NATIONAL |
| 0001 | | WEATHER |
| ... | ... | ... |
| 0100 | SPORTS | SPORTS NEWS |
| ... | ... | ... |
| 0400 | MUSIC | DOMESTIC ROCK·POPS |
| 0401 | | OVERSEAS ROCK·POPS |
| 0402 | | CLASSIC·OPERA |
| 0403 | | JAZZ·FUSION |
| 0404 | | POPULARSONG·TRADITIONAL BALLAD |
| ... | ... | ... |

FIG. 6

| GENRE CHARACTERISTIC WORD | CORRESPONDING GENRE | WEIGHT (ADDED POINT) | WEIGHT (SUBTRACTED POINT) |
|---|---|---|---|
| PERFORMANCE | MUSIC/* | 0.1 | 0.1 |
| CONDUCTOR | MUSIC/CLASSIC | 0.2 | 1 |
| ORCHESTRA | MUSIC/CLASSIC | 0.2 | 1 |
| TRIP | HOBBY/TRAVEL·FISHING·OUTDOOR | 0.1 | 0.1 |
| TRAVELOGUE | HOBBY/TRAVEL·FISHING·OUTDOOR | 0.1 | 0.1 |

FIG. 7

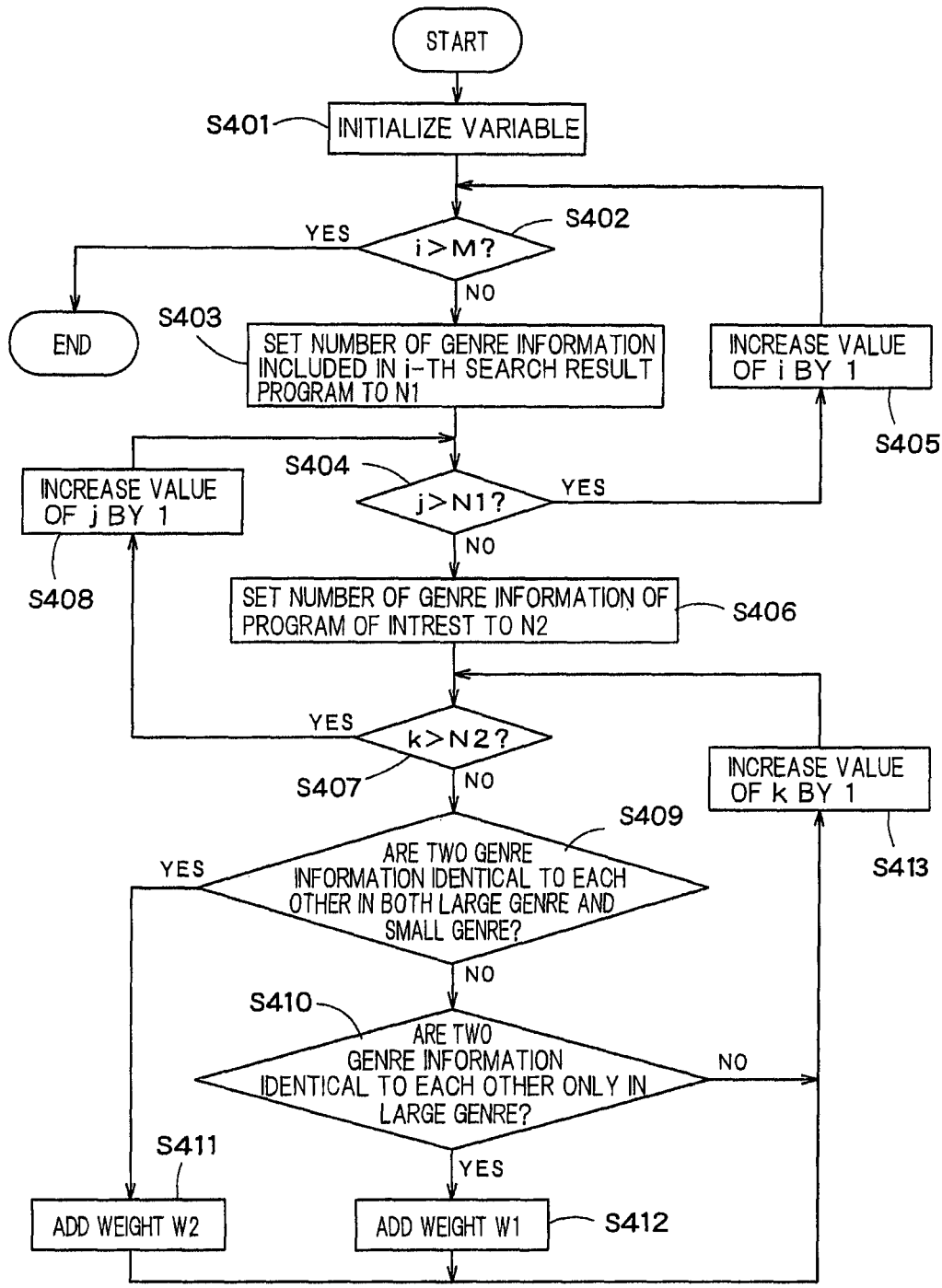
F I G. 11

FIG. 13A

CLASSIC SPECIAL "BEETHOVEN..."

TELEVISION ABC
2009/09/09
FROM 10:00 TO 10:30

TODAY MUSIC "BEETHOVEN'S
SYMPHONY NO.7 and like,
CONDUCTOR: TANAKA TAROU,
PERFORMANCE: EUROPEAN
PHILHARMONIC ORCHESTRA...

FIG. 13B

[BEETHOVEN]

BIOGRAPHY OF GREAT
PERSON "BEETHOVEN"

TELEVISION ABC
2009/09/10
FROM 22:00 TO 22:50

[TANAKA TAROU]

LISTENING TO THAT
PERSON "JAPANESE
CONDUCTOR..."

TELEVISION ABC
2009/09/09
FROM 20:00 TO 20:55

[SYMPHONY NO.7]

SUNDAY DRAMA "..."
EPISODE 1

XYZ BROADCASTING
2009/09/09
FROM 21:00 TO 21:55

FIG. 13C

[MUSIC]

HISTORY OF CLASSIC
MUSIC

○○ CHANNEL
2009/09/09
FROM 22:00 TO 22:50

[MUSIC]

CLASSIC MUSIC
FESTIVAL

○○ CHANNEL
2009/09/10
FROM 22:00 TO 22:50

[MUSIC]

EURO MUSIC

XYZ BROADCASTING
2009/09/10
FROM 21:00 TO 21:50

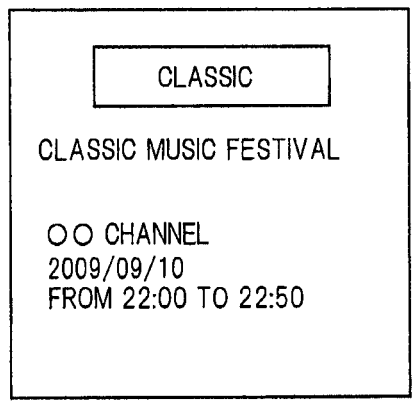
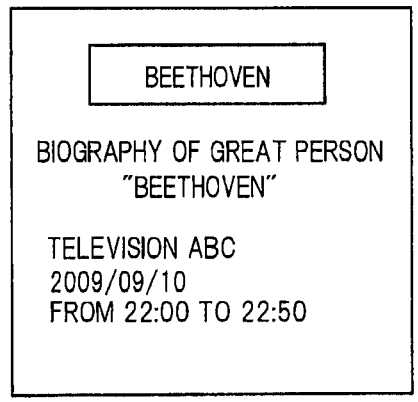
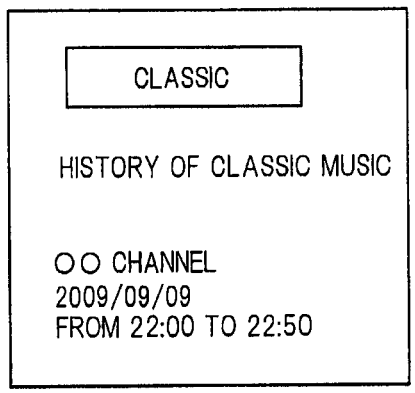
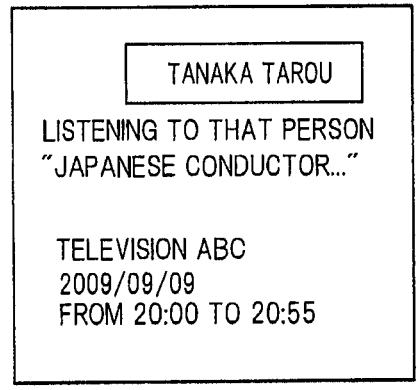
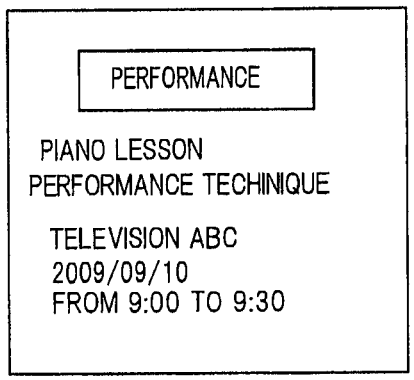
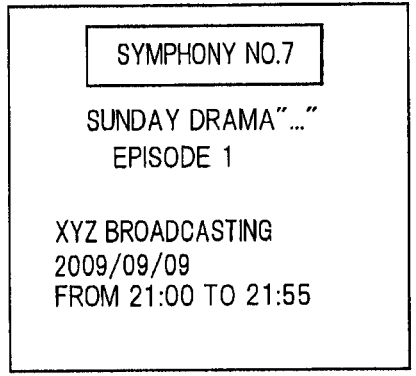
F I G. 15A          F I G. 15B

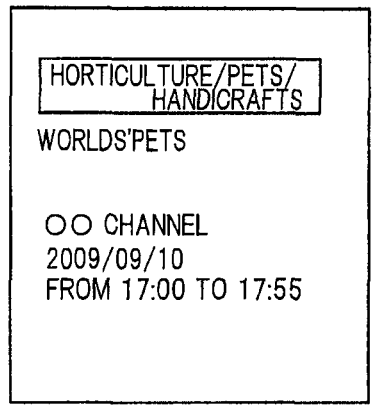
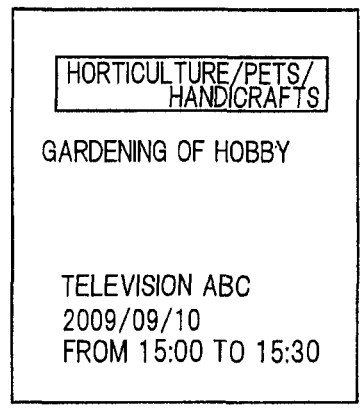
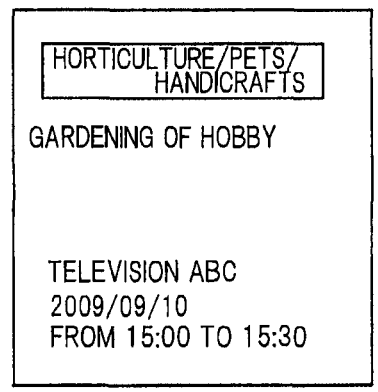
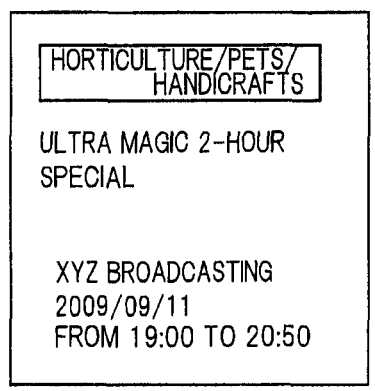
F I G. 16A    F I G. 16B

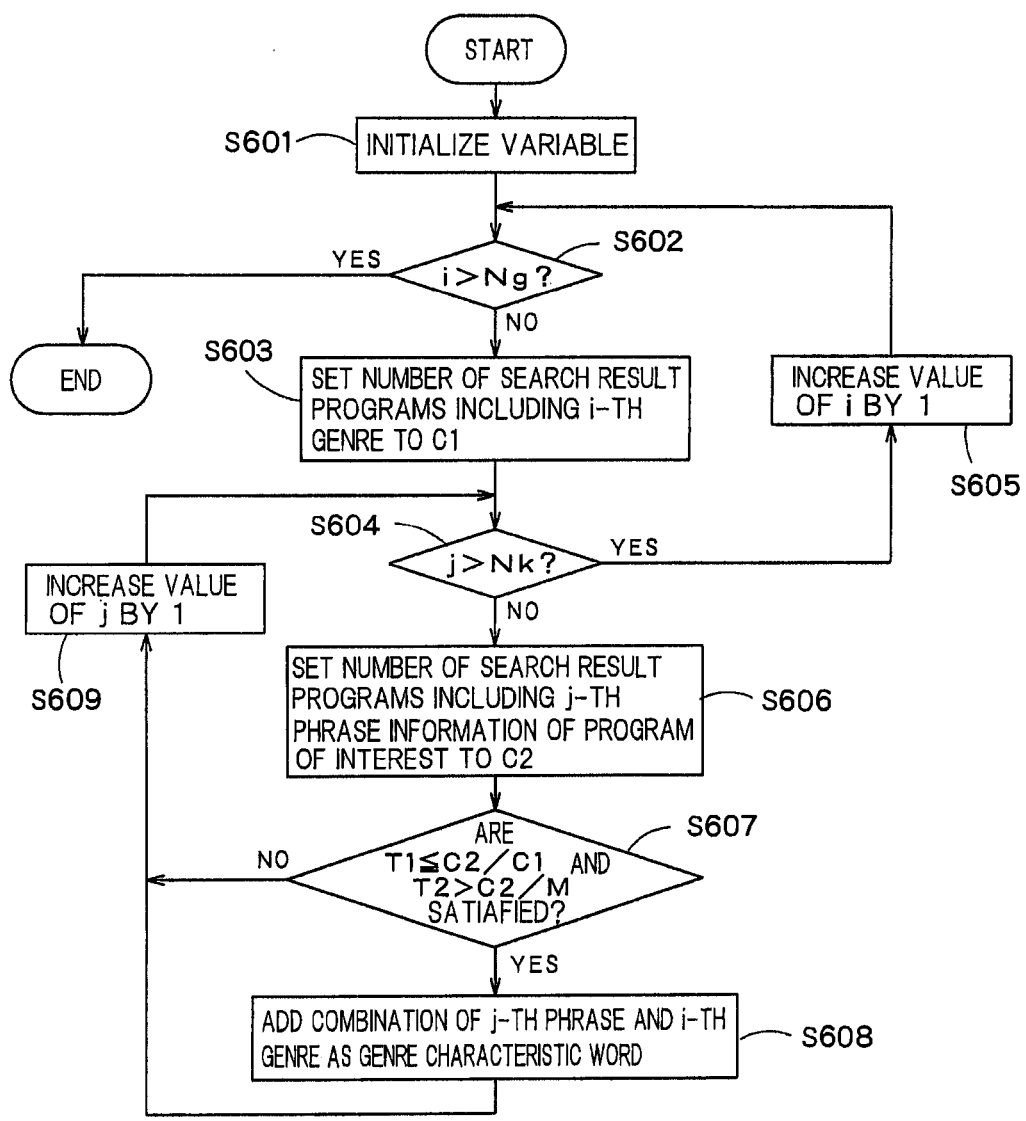
F I G. 18

SIMILAR CONTENT SEARCH DEVICE AND COMPUTER-READABLE STORAGE MEDIUM

CROSS REFERENCE TO RELATED APPLICATIONS

This application is based on the International Application No. PCT/JP2009/067345, filed on Oct. 5, 2009, the entire contents of which are incorporated herein by reference.

FIELD

Embodiments described herein relate generally to a similar content search device and a computer-readable storage medium.

BACKGROUND

As television broadcasting, there are various forms such as terrestrial broadcasting, broadcasting satellite (BS) broadcasting, communications satellite (CS) broadcasting, cable television, and Internet broadcasting, and many programs are being provided to viewers. As one of techniques for searching for a program that a viewer desires to view, there is a similar program search.

As one of similar program search methods, a method of extracting words from electronic program guide (EPG) information of a program designated by a user, searching for EPG information of all programs using the words, and deciding a program similar to a designated program based on an appearance frequency of each word has been proposed. A technique of allocating the types of genres allocated to each of azimuth directions on an XY plane centering on an original point, arranging similar programs according to the genre, and presenting the similar programs to a user has been also known.

When the phrase-based similar program search is performed on program information having a genre, programs of the same genre are searched as similar programs. However, it is difficult to search for programs which differ in a genre but are high in similarity.

A technique of presenting a similar program based on a phrase and a similar program based on a genre in parallel has been proposed. However, this technique has the following problems. That is, programs having high similarity may be concentrated to a similar genre program output side. Further, when granularity of a genre of a program designated by a user is coarse (for example, a genre name "horticulture•pets•handicrafts"), programs of a very similar genre may be output to a similar phrase output side, and program of a different genre may be output to a similar genre program output side.

BRIEF DESCRIPTION OF THE DRAWINGS

FIG. 1 is a schematic configuration diagram of a similar content search device according to a first embodiment;

FIG. 2 is a flowchart for describing a similar content search method;

FIG. 3 is a diagram illustrating an example of program information;

FIG. 4 is a diagram illustrating an example of a screen for designating program of interest;

FIG. 5 is a diagram illustrating an example of extracted phrase information;

FIG. 6 is a diagram illustrating an example of genre definition;

FIG. 7 is a diagram illustrating a storage format of genre characteristic word information;

FIG. 11 is a flowchart for describing a method of calculating a genre similarity;

FIGS. 13A to 13C are examples of a program of interest and listed similar programs;

FIGS. 15A and 15B are diagrams illustrating similar phrase programs according to a comparative example;

FIGS. 16A and 16B are diagrams illustrating similar genre programs according to a comparative example;

FIG. 18 is a flowchart for describing a method of adding a genre characteristic word.

DETAILED DESCRIPTION

Figures 8, 9:
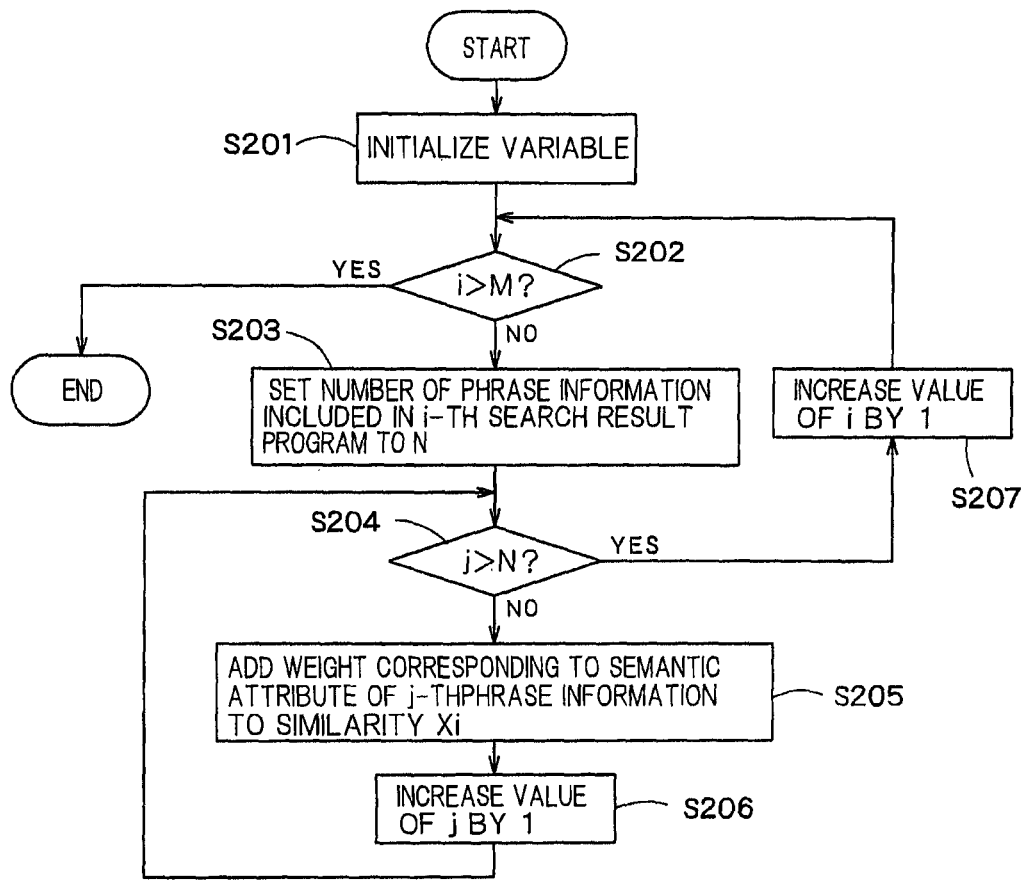
FIG. 8 is a flowchart for describing a phrase similarity calculating method.
FIG. 9 is a diagram illustrating an example of correspondence between a semantic attribute of a phrase and a weight added to a phrase similarity.

According to one embodiment, a similar content search device comprises an information acquiring unit that acquires a plurality of program information including description information and genre information of a content, an information storage unit that stores the plurality of program information, a receiving unit that receives a designation of a program of interest, a phrase extracting unit that acquires program information of the program of interest from the information storage unit and extracts a phrase from description information included in the program information of the program of interest, a first searching unit that searches for first program information having the phrase from the information storage unit, a genre characteristic word storage unit that stores a combination of a genre and a phrase characteristic of the genre, a phrase similarity calculating unit that calculates a phrase similarity between the program information of the program of interest and the first program information, a reducing unit that reduces the phrase similarity when a phrase stored in the genre characteristic word storage unit is included in the program information of the program of interest and the first program information and a genre combined with the phrase is included in the program information of the program of interest and the first program information, a first presenting unit that presents the first program information based on the phrase similarity reduced by the reducing unit, a genre extracting unit that extracts genre information included in the program information of the program of interest, a second searching unit that searches for second program information having the genre information from the information storage unit, a genre similarity calculating unit that calculates a genre similarity between the program information of the program of interest and the second program information, and a second presenting unit that presents the second program information based on the genre similarity.

Hereinafter, embodiments of the present invention will be described with reference to the accompanying drawings.

First Embodiment

FIG. 1 illustrates a schematic configuration of a similar content search device according to the first embodiment of the present invention. The similar content search device includes an information acquiring unit 10, an information storage unit 11, a receiving unit 12, a phrase extracting unit 13, a phrase searching unit (first searching unit) 14, a phrase similarity calculating unit 15, a similar phrase content presenting unit (first presenting unit) 16, a genre extracting unit 17, a genre searching unit (second searching unit) 18, a genre similarity calculating unit 19, a similar genre content presenting unit (second presenting unit) 20, a genre characteristic word storage unit 21, a phrase similarity reducing unit 22, and a genre similarity increasing unit 23.

The information acquiring unit 10 acquires program information such as an EPG including description information and genre information of a video program (content) from a received broadcast wave. The broadcast wave is not limited to a specific broadcast form and may have various broadcast forms which include EPG information such as terrestrial broadcasting, BS broadcasting, CS broadcasting, cable television, and Internet broadcasting. Further, broadcast waves of two or more broadcast forms may be received.

The description information is information representing the details of content of a video program. In EPG information, the description information is configured with program title information, program overview information, or the like. The genre information is information representing a name of a classification set when video programs are classified according to the content, and is represented by a character string representing the content of a classification set, a numerical code defined by the outside, or the like.

The program information (EPG information) may include broadcast date and time information, broadcast station information, and the like in addition to the description information and the genre information.

The information storage unit 11 stores program information on a plurality of video programs acquired by the information acquiring unit 10 in a format readable by the phrase extracting unit 13, the phrase searching unit 14, and the genre searching unit 18. For example, the information storage unit 11 is configured with a hard disk or a flash memory.

The receiving unit 12 receives a designation of a program of interest by a user. The program of interest may be designated by actively selecting a video program by the user or by an action representing that the user is interested in a video program. For example, the action refers to viewing, recording, recording reservation, and the like of a video program. The receiving unit 12 takes program information of a program of interest out of the information storage unit 11, and outputs the program information to the phrase extracting unit 13 and the genre extracting unit 17.

The phrase extracting unit 13 extracts phrases representing the content of the program of interest from description information included in the program information of the program of interest (program-of-interest information) received from the receiving unit 12. Here, phrases are extracted from program title information and program overview information. Morphological analysis, semantic information extraction, or the like may be used for phrase extraction. A specific type may be selected from a result of the morphological analysis or the semantic information extraction. Besides character strings obtained by segmenting the program title information or the program overview information, the type of extracted original information, the position on an extraction source character string, the type of phrase, semantic information, the number of times of appearance in original information, or the like may be further extracted.

The phrase searching unit 14 searches for program information including the phrase extracted by the phrase extracting unit 13 from the program information stored in the information storage unit 11, and acquires the program information for each program.

The phrase similarity calculating unit 15 calculates a phrase similarity between the program information of the program searched and acquired by the phrase searching unit 14 and the program-of-interest information. A method of calculating the phrase similarity will be described later.

The genre characteristic word storage unit 21 stores a combination of a genre and a phrase characteristic of a corresponding genre. The characteristic phrase refers to a phrase which is high in the appearance frequency in a certain genre but low in the appearance frequency in other genres. For example, a phrase "performance" is high in the appearance frequency in a genre "music," but low in the appearance frequency in a genre other than "music." Thus, a combination of a genre characteristic word "performance" and a corresponding genre "music" is stored in the genre characteristic word storage unit 21. For example, the genre characteristic word storage unit 21 is configured with a hard disk or a flash memory.

The phrase similarity reducing unit 22 determines whether or not the genre characteristic word stored in the genre characteristic word storage unit 21 is included in both the program information of the program searched and acquired by the phrase searching unit 14 and the program-of-interest information. When it is determined that the common genre characteristic word is included in both the program information of the program searched and acquired by the phrase searching unit 14 and the program-of-interest information, the phrase similarity reducing unit 22 determines whether or not a genre corresponding to the genre characteristic word is included in both the program information of the program searched and acquired by the phrase searching unit 14 and the program-of-interest information. When it is determined that the genre corresponding to the genre characteristic word is included, the phrase similarity reducing unit 22 reduces the phrase similarity calculated by the phrase similarity calculating unit 15.

In other words, when the common genre characteristic word is included in two program information of the program-of-interest information and the program information of the phrase similarity calculation target and the genre corresponding to the genre characteristic word is included in both of the two program information, the phrase similarity reducing unit 22 reduces the phrase similarity.

As described above, the genre characteristic word is a phrase having the high appearance frequency in the corresponding genre, and even though the phrases are identical to each other, a similarity in the content between two programs is not necessarily high. Thus, the phrase similarity reducing unit 22 reduces the similarity.

The similar phrase content presenting unit 16 determines the order of the programs searched and acquired by the phrase searching unit 14 based on the phrase similarity, and presents the programs to the user according to the order. A presenting method will be described later.

The genre extracting unit 17 extracts genre information from the program-of-interest information received from the receiving unit 12.

The genre searching unit 18 searches for program information including the genre extracted by the genre extracting unit 17 from the program information stored in the information storage unit 11, and acquires the program information for each program.

The genre similarity calculating unit 19 calculates a genre similarity between the program information of the program searched and acquired by the genre searching unit 18 and the program-of-interest information. A method of calculating the genre similarity will be described later.

The genre similarity increasing unit 23 increases the genre similarity calculated by the genre similarity calculating unit 19 when a genre characteristic word corresponding to a genre which is common to two program information of the program-of-interest information and the program information of the genre similarity calculation target is included in both of the two program information.

When granularity of a genre classification is coarse, a similarity in the content between the two programs is not necessarily high even though the two programs are identical in genre to each other. For this reason, when the genre characteristic word is included, the genre similarity increasing unit 23 increases the genre similarity to be higher than when the genre characteristic word is not included.

The similar genre content presenting unit 20 determines the order of programs searched and acquired by the genre searching unit 18 based on the genre similarity, and presents the programs to the user according to the order. A presenting method will be described later.

Next, an operation of the similar content search device will be described with reference to a flowchart illustrated in FIG. 2. Here, considered is an operation of a similar content search device in software which is installed in a television and is capable of receiving video programs according to a plurality of broadcast forms and providing a viewing function, a recording function, and a recording reservation function. FIG. 2 illustrates an overall operation flow from when the similar content search device receives a broadcast wave to when the similar content search device presents similar contents in the decided order.

(Step S101) The broadcast wave is received.

(Step S102) The information acquiring unit 10 acquires program information (EPG information) of all programs from the broadcast wave. The acquired program information is stored in the information storage unit 11.

FIG. 3 illustrates an example of the acquired program information. One row of a table illustrated in FIG. 3 corresponds to one program. Each program information includes a program identification ID, a broadcast station name, a program title, a maximum of three types of genre codes, program overview information, and start/end date and time. The information is stored in a format which can be used by the receiving unit 12, the phrase searching unit 14, the genre searching unit 18, and the like.

(Step S103) The receiving unit 12 receives a designation of a program of interest from a user. FIG. 4 illustrates an example of a screen for designating a program of interest. A program list of a table form is displayed on a screen W. Here, a row represents a time axis, a column represents a broadcast station, and a block in the table corresponds to one program. In the block, a program title is stated, but program overview information or the like may be displayed. The user can operate a pointer P using an instructing device such as a remote controller, and designates a program of interest by putting the pointer P on a program of interest and designating the program of interest.

(Step S104) The receiving unit 12 acquires program information of the program of interest (program-of-interest information) from the information storage unit 11, and outputs the program information to the phrase extracting unit 13 and the genre extracting unit 17.

(Step S105) The phrase extracting unit 13 extracts phrase information from description information (program title information and program overview information) of the program-of-interest information. The phrase extracting unit 13 performs morphological analysis or semantic analysis on a character string of the program title information and a character string of the program overview information, and extracts words having a specific semantic attribute or word class from the analysis result as phrase information.

As the semantic analysis, there may be used for example, a known named entity extraction technique, which is stated in "A Study of the Relations among Question Answering, Japanese Named Entity Extraction, and Named Entity Taxonomy" Yumi Ichimura, at. al., Interest Group Notes of Information Processing Society of Japan, NL-161-3, 2004.

FIG. 5 illustrates an example of the extracted phrase information. The phrase information is extracted as a set of an ID of an appeared video program, semantic information/word class information of phrase information, the type of description information which is an extraction source, and the number of times of appearance in addition to a character string extracted from the description information. The phrase information illustrated in FIG. 5 may be temporarily stored in a memory or may be written back to the information storage unit 11.

(Step S106) The genre extracting unit 17 extracts genre Information from the program-of-interest information.

FIG. 6 illustrates an example of the genre information. The genre information is represented by a numerical code or a phrase representing a meaning, and a genre system is defined by a two-level structure of a large genre and a small genre.

(Step S107) The phrase searching unit 14 searches for a program (other than a program of interest) in which at least one of phrases extracted in Step S105 is included in the program title information or the program overview information from the information storage unit 11, and acquires program information of the program.

(Step S108) The phrase similarity calculating unit 15 calculates a phrase similarity between each of the programs of the search result of Step S107 and the program of interest. A method of calculating the phrase similarity will be described later.

(Step S109) In a combination of each program of the search result of Step S107 and the program of interest, it is determined whether or not a common phrase corresponds to the genre characteristic word and a genre corresponding to the genre characteristic word is included in the search result program and the program of interest. When there is a search result program in which the phrase common with the program of interest corresponds to the genre characteristic word and the corresponding genre is included in the program of interest and the search result program, the process proceeds to Step S110, and otherwise the process proceeds to Step S111.

FIG. 7 illustrates an example of a format of genre characteristic word information stored in the genre characteristic word storage unit 21. Each genre characteristic word information is defined by a set of a character string of a characteristic word, a corresponding genre, and a weight at the time of increase and a weight at the time of increment. Besides the format of FIG. 7, for the sake of simplicity, the weight at the time of increment and the weight at the time of reduction may be set to the same value, and the weight may be added or subtracted at a ratio. Further, a plurality of corresponding genres may be set to each genre characteristic word.

(Step S110) The phrase similarity on the search result program, in which the phrase common with the program of interest corresponds to the genre characteristic word and the corresponding genre is included in the program of interest and the search result program, is reduced by the phrase similarity reducing unit 22. A reduced value is a weight at the time of reduction in FIG. 7.

(Step S111) A predetermined number of programs are listed (selected) in the descending order of phrase similarity as presentation programs.

(Step S112) The genre searching unit 18 searches for a program (other than the program of interest) in which the genre information extracted in Step S106 is included in the program information from the information storage unit 11, and acquires the program information of the program. When a plurality of genre information is extracted in Step S106, a program including at least one of the plurality of extracted genre information is searched.

(Step S113) The search result program of Step S112 is compared with the programs listed in Step S111, and the overlapped program is deleted from the search result.

(Step S114) The genre similarity calculating unit 19 calculates a genre similarity between each of the search result programs and the program of interest. A method of calculating the genre similarity will be described later.

(Step S115) In a combination of each search result program and the program of interest, it is determined whether or not the genre characteristic word corresponding to the common genre is included in the program information of the search result program and the program-of-interest information. When it is determined that the genre characteristic word corresponding to the common genre is included, the process proceeds to Step S116, and otherwise the process proceeds to Step S117.

(Step S116) The genre similarity on the search result program including the genre characteristic word is increased by the genre similarity increasing unit 23. An increased value is a weight at the time of increment in FIG. 7.

(Step S117) A predetermined number of programs are listed (selected) in the descending order of genre similarity as presentation programs.

(Step S118) The programs listed in Step S111 and S117 are presented to the user.

Next, a method of calculating the phrase similarity in Step S108 will be described with reference to a flowchart illustrated in FIG. 8.

(Step S201) Variables used in the present flow are initialized. The number of search result programs is set to M, values of indices i and j are set to 1, and a phrase similarity Xi ($1 \leq i \leq M$) is set to 0. Xi represents a phrase similarity between an i-th search result program and the program of interest.

(Step S202) The index i is compared with the number M of search result programs. When i is larger than M, since the phrase similarities on all of the search result programs have been calculated, and thus the process ends. When i is not larger than M, the process proceeds to Step S203.

(Step S203) Phrase information that appears in both the program information of the i-th search result program and the program-of-interest information is acquired, and the number of acquired phrase information is set to N.

(Step S204) The index j is compared with the number N of phrase information. When j is larger than N, since addition of the phrase similarity on all phrase information has ended, the process proceeds to Step S207. When j is not larger than N, the process proceeds to Step S205.

(Step S205) A corresponding weight value is added to the phrase similarity Xi with reference to a semantic attribute or a word class of a j-th phrase information. The weight corresponding to the semantic attribute or the word class is defined as illustrated in FIG. 9, and stored in a storage unit (not illustrated).

(Step S206) A value of the index j is increased by 1.

(Step S207) A value of the index i is increased by 1.

The phrase similarity is calculated by the above described method.

Figure 10:
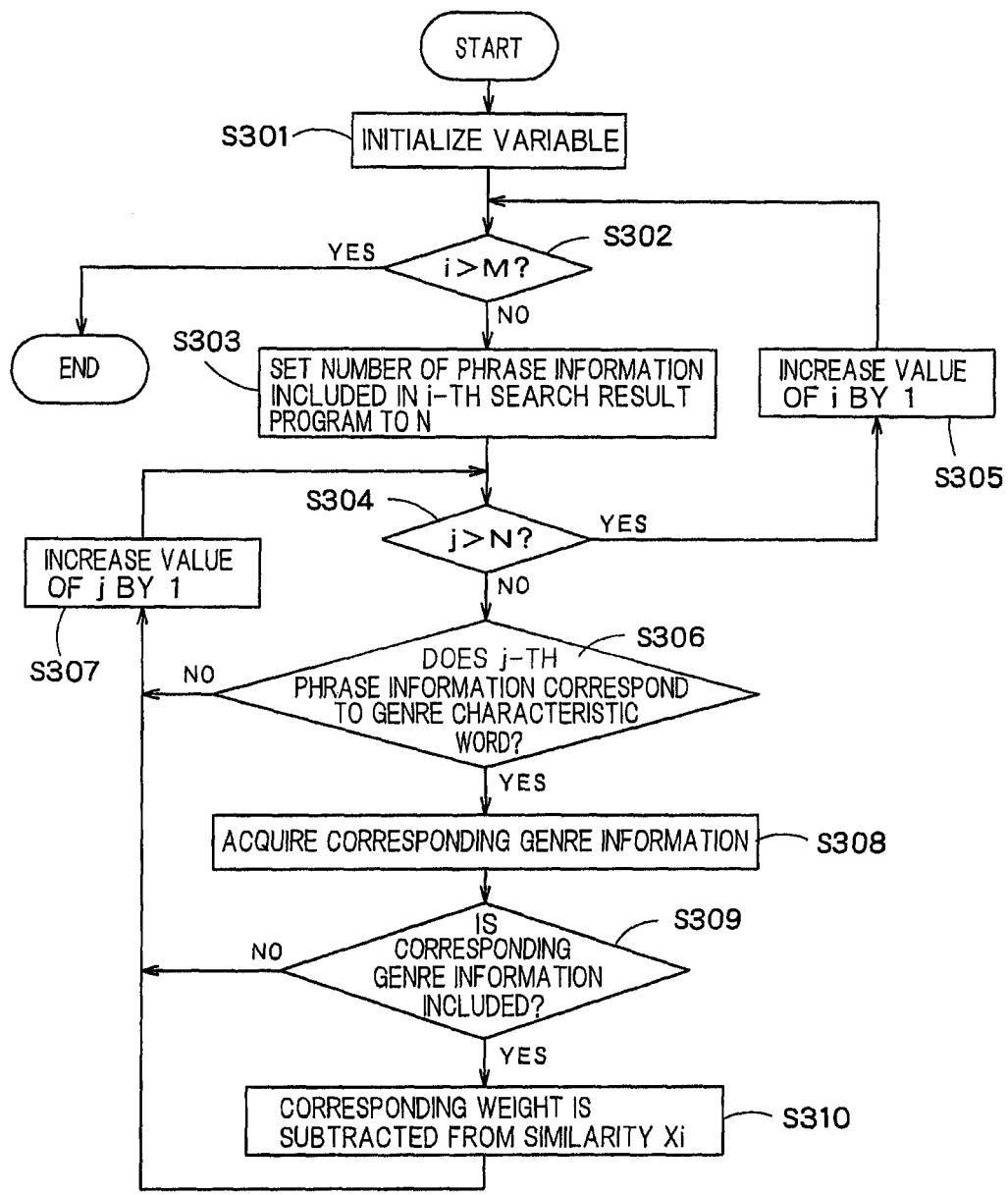
FIG. 10 is a flowchart for describing a method of reducing a phrase similarity.

Next, a method of reducing the phrase similarity in Step S109 and S110 will be described with reference to a flowchart illustrated in FIG. 10.

(Step S301) Variables used in the present flow are initialized. The number of search result programs is set to M, values of indices i and j are set to 1. The value calculated in Step S108 is used as the phrase similarity Xi.

(Step S302) The index i is compared with the number M of search result programs. When i is larger than M, since a determination and a phrase similarity re-calculation on all of the search result programs have ended, the process ends. When i is not larger than M, the process proceeds to Step S303.

(Step S303) Phrase information that appears in both the program information of the i-th search result program and the program-of-interest information is acquired, and the number of acquired phrase information is set to N.

(Step S304) The index j is compared with the number N of phrase information. When j is larger than N, since a determination on whether or not it corresponds to the genre characteristic word and subtraction of the phrase similarity on all phrase information has ended, the process proceeds to Step S305. When j is not larger than N, the process proceeds to Step S306.

(Step S305) A value of the index i is increased by 1.

(Step S306) It is determined whether or not a j-th phrase information is included in the list with reference to the genre characteristic word list illustrated in FIG. 7. When it is determined that the j-th phrase information is not included in the list, the process proceeds to Step S307, and otherwise the process proceeds to Step S308.

(Step S307) A value of the index j is increased by 1.

(Step S308) Genre information corresponding to the same genre characteristic word as the j-th phrase information is acquired.

(Step S309) It is determined whether or not the genre information acquired in Step S308 is included in both the i-th search result program and the program of interest. It is determined that the genre information is included in both the i-th search result program and the program of interest, the process proceeds to Step S310, and otherwise the process proceeds to Step S307.

(Step S310) A weight value corresponding to the corresponding genre characteristic word is acquired from the genre characteristic word list, and the weight value is subtracted from the phrase similarity Xi.

The phrase similarity is reduced by the above described method.

Next, a method of calculating the genre similarity in Step S114 is described with reference to a flowchart illustrated in FIG. 11.

(Step S401) Variables used in the present flow are initialized. The number of search result programs is set to M, values of indices i, j, and k are set to 1, and a genre similarity Yi ($1 \leq i \leq M$) is set to 0. Yi represents a genre similarity between an i-th search result program and the program of interest.

(Step S402) The index i is compared with the number M of search result programs. When i is larger than M, since the genre similarities on all of the search result programs have been calculated, the process ends. When i is not larger than M, the process proceeds to Step S403.

(Step S403) Genre information of the i-th search result program is acquired, and the number of acquired genre information is set to N1.

(Step S404) The index j is compared with the number N1 of genre information. When j is larger than N1, since addition of the genre similarity on combinations of all genre information has ended, the process proceeds to Step S405. When j is not larger than N1, the process proceeds to Step S406.

(Step S405) A value of the index i is increased by 1.

(Step S406) The genre information of the program of interest is acquired, and the number of acquired genre information is set to N2.

(Step S407) The index k is compared with the number N2 of genre information. When k is larger than N2, the process proceeds to Step S408. When k is not larger than N2, the process proceeds to Step S409.

(Step S408) A value of the index j is increased by 1.

(Step S409) The j-th genre information of the i-th search result program is compared with the k-th genre information of the program of interest. When the two genre information are identical to each other in both the large genre and the small genre illustrated in FIG. 6, the process proceeds to step S411, and otherwise the process proceeds to step S410.

(Step S410) When the two genre information are identical to each other only in the large genre, the process proceeds to step S412, and when the two genre information are not identical to each other in any of the large genre and the small genre, the process proceeds to step S413.

(Step S411) A weight W1 is added to the genre similarity Yi.

(Step S412) A weight W2 is added to the genre similarity Yi. The weight W2 is a value smaller than the weight W1.

(Step S413) A value of the index k is increased by 1.

The genre similarity can be calculated by the above described method. In the method illustrated in FIG. 11, for a certain search result program, a degree of coincidence of genre information is obtained in all combinations such as N1×N2 on the number N1 of genre information and the number N2 of genre information of the program of interest, and the weights W1 and W2 are added to the genre similarity. However, the genre information used once for a comparison may not be used again. In this case, the genre similarity Yi may have two or more values according to a combination of genre information to be compared, however, the largest value may be used as the genre similarity Yi.

Figure 12:
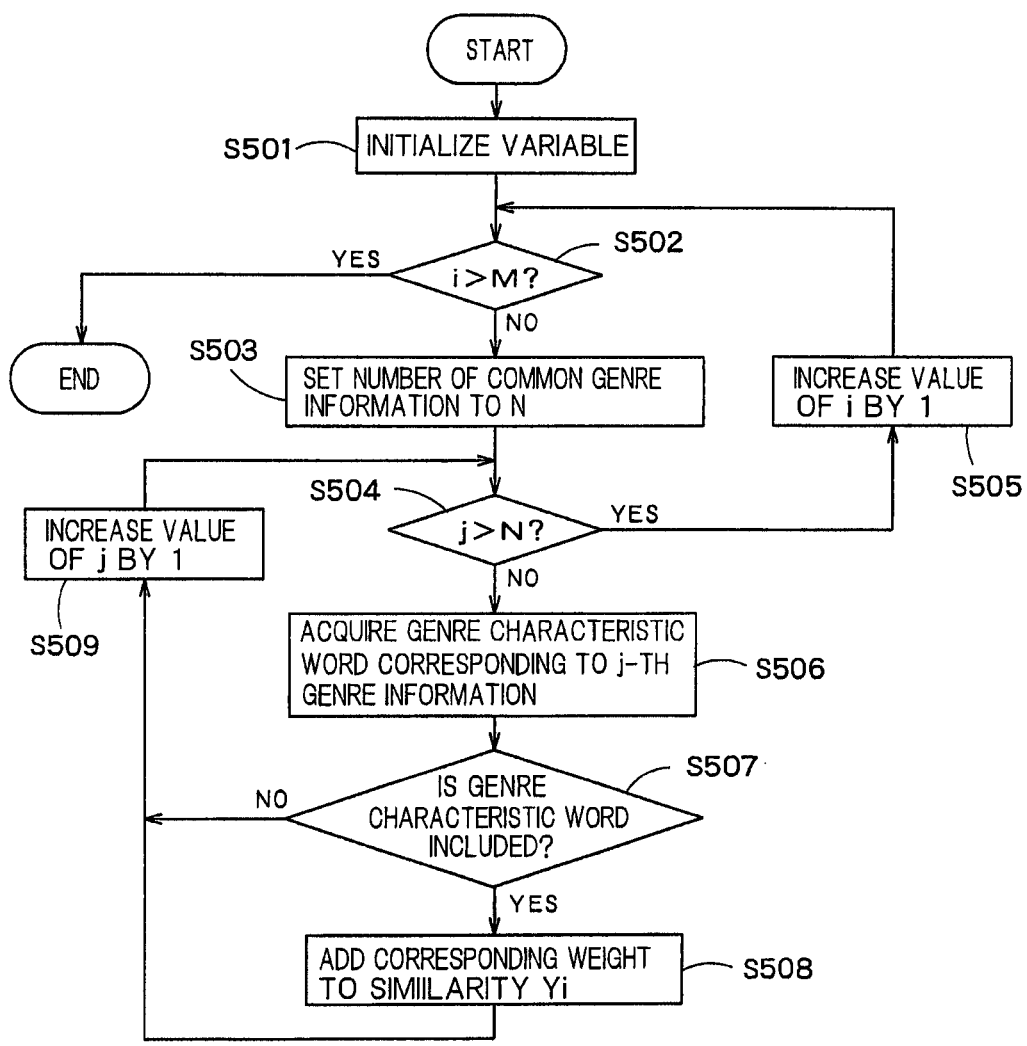
FIG. 12 is a flowchart for describing a method of increasing a genre similarity.

Next, a method of increasing the genre similarity in steps S115 and S116 will be described with reference to a flowchart illustrated in FIG. 12.

(Step S501) Variables used in the present flow are initialized. The number of search result programs is set to M, and values of indices i and j are set to 1. The value calculated in Step S114 is used as the genre similarity Yi.

(Step S502) The index i is compared with the number M of search result programs. When i is larger than M, since a determination and a genre similarity re-calculation on all of the search result programs have ended, the process ends. When i is not larger than M, the process proceeds to Step S503.

(Step S503) Genre information which is common to the i-th search result program and the program of interest is acquired, and the number of acquired genre information is set to N.

(Step S504) The index j is compared with the number N of genre information. When j is larger than N, the process proceeds to Step S505. When j is not larger than N, the process proceeds to Step S506.

(Step S505) A value of the index i is increased by 1.

(Step S506) A genre characteristic word corresponding to the j-th genre information is acquired with reference to the genre characteristic word list illustrated in FIG. 7.

(Step S507) It is determined whether or not the genre characteristic word acquired in step S506 is included in the program-of-interest information and the program information of the search result program. When it is determined that the genre characteristic word is included, the process proceeds to Step S508, and otherwise the process proceeds to Step S509.

In this step, a determination on whether or not genre characteristic words having a similar meaning are included in the program-of-interest information and the program information of the search result program may be further performed. For example, when a genre characteristic word "horticulture" is included in the program-of-interest information and a genre characteristic word "gardening" is included in the program information of the search result program, the process proceeds to step S508.

(Step S508) A weight corresponding to the genre characteristic word is added to the genre similarity Yi.

(Step S509) A value of j is increased by 1.

The genre similarity is increased by the above described method.

By the above described method, similar phrase programs illustrated in FIG. 13A and similar genre programs illustrated in FIG. 13B are listed on a program of interest illustrated in FIG. 13C. In FIGS. 13B and 13C, programs are arranged from the top to the bottom in the descending order of similarity. A phrase or a genre which is common to each similar program and the program of interest is also illustrated.

Figure 14:
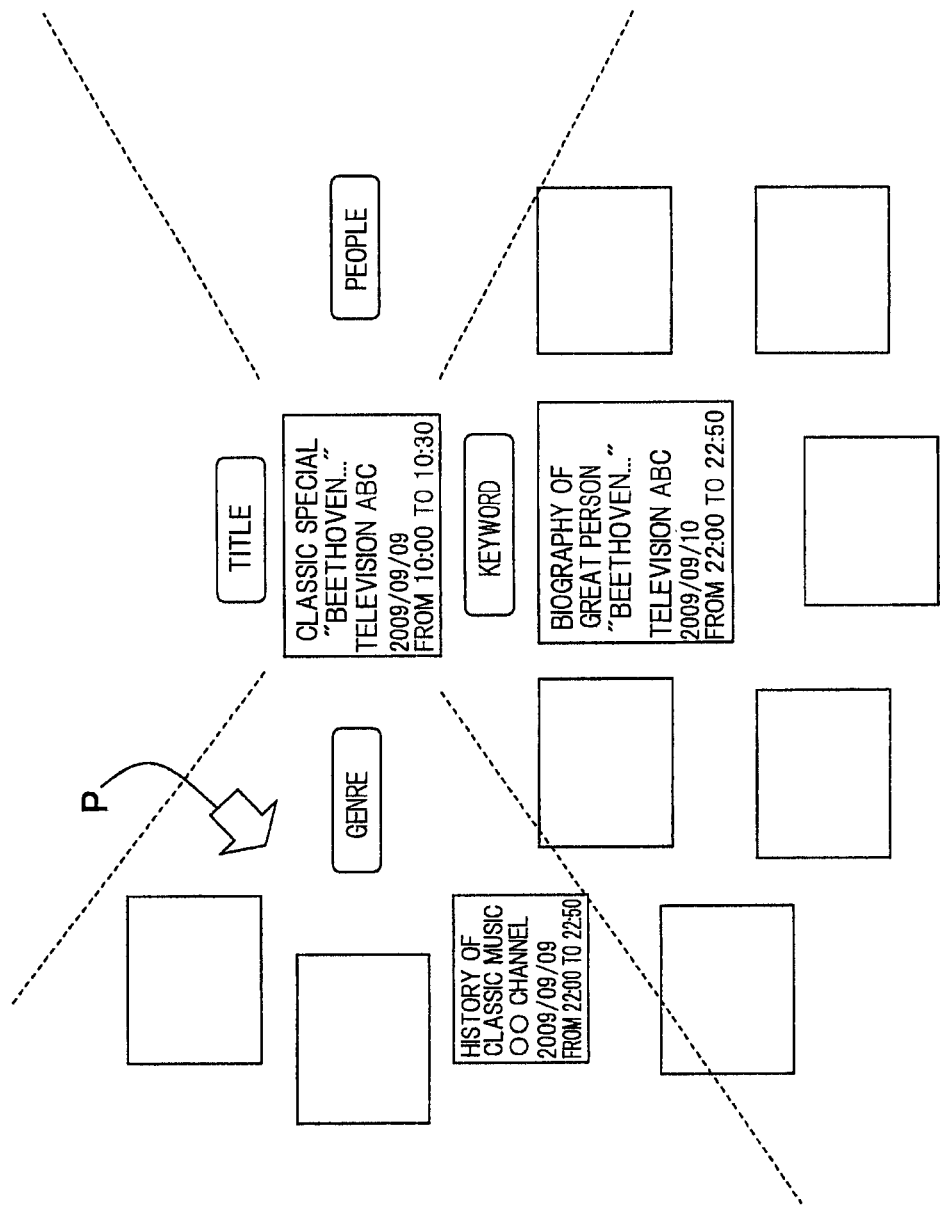
FIG. 14 is a diagram illustrating a presentation example of a similar program.

The listed programs are displayed on a screen in a form illustrated in FIG. 14 and presented to the user. The screen is divided into four areas of a genre, a keyword, people, and a title centering on a program of interest. In each area, a program having similarity is arranged at the position periphery to the program of interest (at the center of the screen). A similar genre program is displayed in the genre area (at the left side of the screen), and a similar phrase program is displayed on the keyword area (at the lower side of the screen).

The user operates the pointer P on the screen to select the similar program and then can view or record the selected similar program.

For the program of interest illustrated in FIG. 13A, similar phrase programs, which are assumed to be selected by a similar content search device that does not include the genre characteristic word storage unit 21 and the phrase similarity reducing unit 22, are illustrated in FIG. 15A. FIG. 15B is the same as FIG. 13B and illustrates similar phrase programs selected by the similar content search device according to the present embodiment.

The similar phrase programs illustrated in FIG. 15A are selected since phrases such as mainly "classic" and "performance" are identical. However, these phrases are words that frequently appear in video programs associated with classic music, are not necessarily characteristic of the content of each program.

In this case, in the present embodiment, the phrase similarity of a program including the genre characteristic word such as "classic" and "performance" is reduced, and programs including phrases which are more characteristic of the content such as "Beethoven" "Tanaka Tarou," and "Symphony No. 7" are presented in high places.

FIGS. 16A and 16B illustrate examples of similar genre programs listed for a program of interest with "horticulture/gardening" as theme. FIG. 16A illustrates similar genre programs which are assumed to be selected by a similar content search device that does not include the genre characteristic word storage unit 21 and the genre similarity increasing unit 23. FIG. 16B illustrates similar genre programs selected by the similar content search device according to the present embodiment.

In FIG. 16A, programs related to pets or handicrafts other than horticulture are illustrated. It is because the genre of the programs is defined as "hobby.education/horticulture.pets-.handicrafts" and all programs are classified into the same genre. Actually, broadcast stations may define genres such that small genres having different contents are integrated into one. A "horticulture" program and a "pets" program are the same in genre and so are not different in genre similarity, and programs illustrated in FIG. 16A may be selected.

FIG. 16B illustrates programs of "horticulture". Since a phrase such as "horticulture" is included in a genre characteristic word, the genre similarity of a program including the phrase is increased, and thus the programs are consequently presented in high places.

As described above, according to the present embodiment, the phrase similarity is reduced when a phrase which is common to the search result program and the program of interest is a genre characteristic word having the high appearance frequency in a corresponding genre, whereas the genre similarity is increased when a genre characteristic word corresponding to a genre which is common to the search result program and the program of interest is included in the program information. Accordingly, a similar content based on a phrase and a similar content based on a genre can be appropriately presented.

In the above embodiment, the phrase extracting unit 13 may be configured to be connected with the information acquiring unit 10 and the information storage unit 11. In this configuration, the phrase extracting unit 13 can extract a phrase from the description information of all video programs using the EGP information acquired by the information acquiring unit 10 and cause a combination of the extracted phrase and the EGP information to be stored in the information storage unit 11.

Second Embodiment

Figure 17:
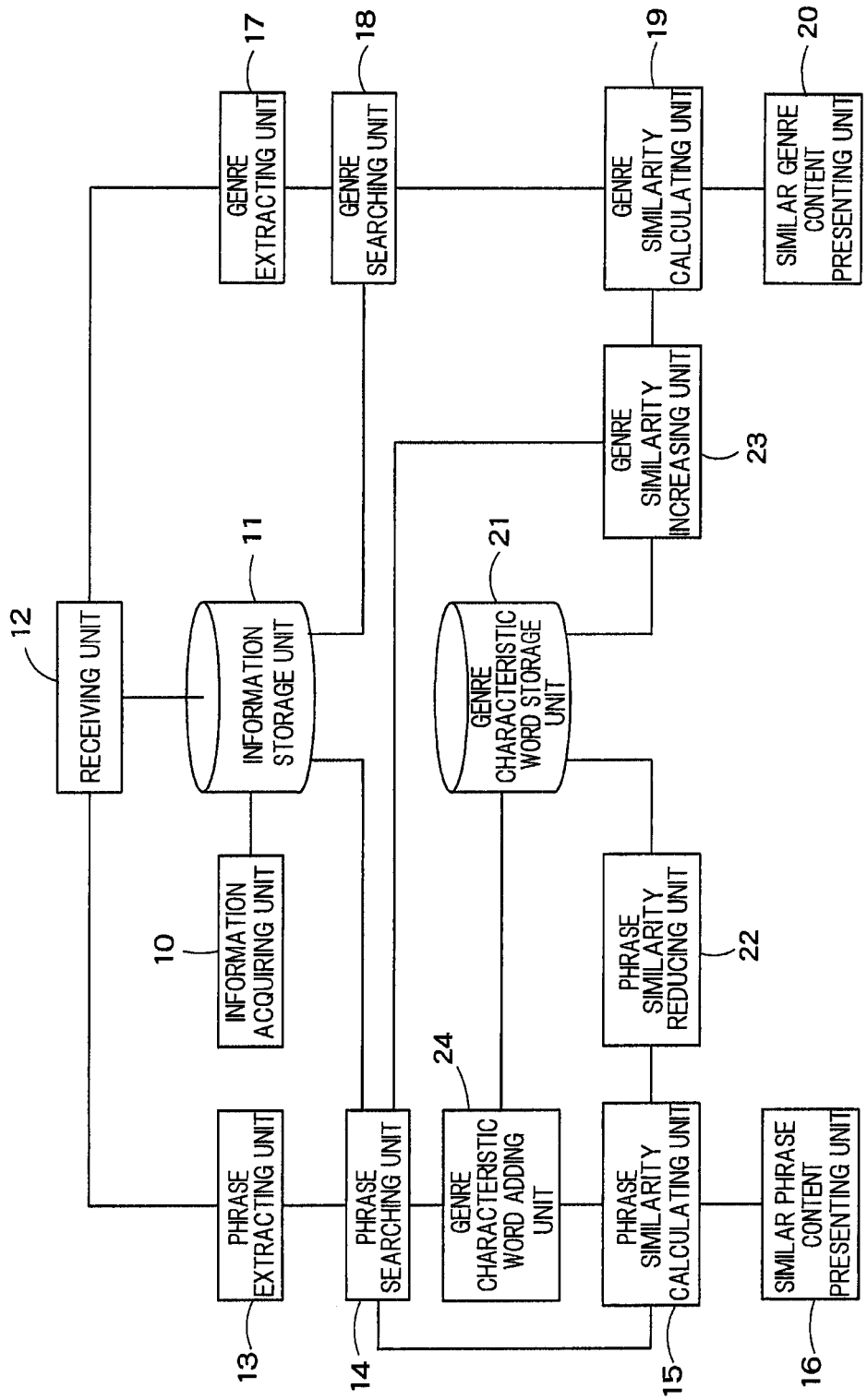
FIG. 17 is a schematic configuration diagram of a similar content search device according to a second embodiment.

FIG. 17 illustrates a schematic configuration of a similar content search device according to a second embodiment of the present invention. The similar content search device according to the present embodiment is configured such that a genre characteristic word adding unit 24 is further included to the similar, content search device, illustrated in FIG. 1, according to the first embodiment.

The genre characteristic word adding unit 24 automatically acquires a new genre characteristic word from the program-of-interest information or the program information searched by the phrase searching unit 14 and the genre searching unit 18, and adds the acquired new genre characteristic word to the genre characteristic word storage unit 21. The new genre characteristic word is a phrase which appears in program information of a certain genre with the high frequency but rarely appears in program information of other genres.

A method of adding a genre characteristic word will be described with reference to a flowchart illustrated in FIG. 18.

(Step S601) Variables used in the present flow are initialized. The number of search result programs searched by the phrase searching unit 14 is set to M, the number of phrases extracted from a program of interest is set to Nk, the number of genres is set to Ng, and values of indices i and j are set to 1.

(Step S602) The index i is compared with the number Ng of extracted genres. When i is larger than Ng, the process of adding a genre characteristic word ends. When i is not larger than Ng, the process proceeds to step S603.

(Step S603) All programs including an i-th genre are selected from among the search result programs, and the number of selected programs is set to C1.

(Step S604) The index j is compared to the number Nk of extracted phrases. When j is larger than Nk, the process proceeds to step S605, and otherwise the process proceeds to step S606.

(Step S605) A value of the index i increased by 1.

(Step S606) Programs including a j-th phrase of the program of interest are selected from among the programs selected in step S603, and the number of selected programs is set to C2.

(Step S607) It is determined whether or not the j-th phrase is a genre characteristic word. Specifically, it is determined whether or not $T1 \leq C2/C1$ and $T2 > C2/M$ are satisfied using two threshold values of T1 and T2. When it is determined that the above conditions are satisfied, the process proceeds to step S608, and otherwise, the process proceeds to step S609.

In the above conditions, the first condition ($T1 \leq C2/C1$) represents that the j-th phrase appears in the program information of the same genre with the high frequency, and the second condition ($T2 > C2/M$) represents that the j-th phrase rarely appears in the program information of other genres.

Further, in this step, it may be determined whether or not the j-th phrase includes a character string representing the i-th genre or a synonym of the character string as a part thereof. This condition is independent of the above described conditions, and thus the conditions may be executed in parallel.

(Step S608) The j-th phrase and the i-th genre are associated with each other as a set and then added to the genre characteristic word storage unit 21 as the genre characteristic word. A description form is the same as in FIG. 7.

(Step S609) A value of the index j is increased by 1.

The new genre characteristic word can be added by the above described method.

According to the present embodiment, the genre characteristic word can be newly added, and thus it is possible to flexibly cope with a word which has not been previously used but has been recently used in a specific genre. Accordingly, a similar content based on a phrase and a similar content based on a genre can be more appropriately presented.

At least a part of the similar content search device described in the above embodiments may be configured with hardware or software. When it is configured with software, a program for implementing a function of at least a part of the similar content search device may be stored in a recording medium such as a flexible disk or a compact disc-read only memory (CD-ROM) and may be read and executed by a computer. The recording medium is not limited to a removable one such as a magnetic disk or an optical disk but may be a fixed type recording medium such as a hard disk device or a memory.

Further, a program for implementing a function of at least a part of the similar content search device may be distributed through a communication line (Including a wireless communication line) such as the Internet. Furthermore, the program may be distributed in a state in which it is encrypted, modulated, or compressed through a wired line or a wireless line such as the Internet or in a form stored in a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A similar content search device, comprising:
an information acquiring unit that acquires a plurality of program information including description information and genre information of a content;
an information storage unit that stores the plurality of program information;
a receiving unit that receives a designation of a program of interest;
a phrase extracting unit that acquires program information of the program of interest from the information storage unit and extracts a phrase from description information included in the program information of the program of interest;
a first searching unit that searches for first program information having the phrase from the information storage unit;
a genre characteristic word storage unit that stores a combination of a genre and a phrase characteristic of the genre;
a phrase similarity calculating unit that calculates a phrase similarity between the program information of the program of interest and the first program information;
a reducing unit that reduces the phrase similarity when the phrase stored in the genre characteristic word storage unit is included in the program information of the program of interest and the first program information and the genre combined with the phrase is included in the program information of the program of interest and the first program information;
a first presenting unit that presents the first program information based on the phrase similarity reduced by the reducing unit;
a genre extracting unit that extracts genre information included in the program information of the program of interest;
a second searching unit that searches for second program information having the genre information from the information storage unit;
a genre similarity calculating unit that calculates a genre similarity between the program information of the program of interest and the second program information; and
a second presenting unit that presents the second program information based on the genre similarity.

2. The device according to claim 1, further comprising an increasing unit that increases the genre similarity when a genre stored in the genre characteristic word storage unit is included in the program information of the program of interest and the second program information and a phrase combined with the genre is included in the program information of the program of interest and the second program information.

3. The device according to claim 2, wherein the phrase extracting unit extracts first to M-th phrases (M is an integer of 2 or more),
the first searching unit searches for the first program information having at least one of the first to M-th phrases, and
the similar content search device further comprises an adding unit that selects program information having the same genre information as the program information of the program of interest from a search result of the first searching unit and adds a combination of a k-th phrase (k is an integer that satisfies $1 \le k \le M$) and the genre information to the genre characteristic word storage unit when a ratio of program information having the k-th phrase in the selected program information is a first predetermined value or more and a ratio of the program information having the k-th phrase in the first program information is less than a second predetermined value.

4. The device according to claim 3, wherein the adding unit adds a combination of a phrase including a character string representing genre information of the program of interest or a synonym of the character string as a part thereof and the genre information to the genre characteristic word storage unit.

5. The device according to claim 1, wherein a screen is divided into a plurality of areas centering on the program information of the program of interest, the first program information is displayed on a first area of the screen, and the second program information is displayed on a second area of the screen which is different from the first area of the screen,
the first program information having a high phrase similarity is arranged at a position close to the program information of the program of interest, and
the second program information having a high genre similarity is arranged at a position close to the program information of the program of interest.

6. A non-transitory computer-readable storage medium storing a similar content search program which causes a computer to execute the steps of:
acquiring a plurality of program information including description information and genre information of a content;
storing the plurality of program information in an information storage unit;
receiving a designation of a program of interest;
acquiring program information of the program of interest from the information storage unit;
extracting a phrase from description information included in the program information of the program of interest;
searching for first program information having the phrase from the information storage unit;
calculating a phrase similarity between the program information of the program of interest and the first program information;
reducing the phrase similarity when a phrase stored in a genre characteristic word storage unit that stores a combination of a genre and a phrase characteristic of the genre is included in the program information of the program of interest and the first program information and the genre combined with the phrase is included in the program information of the program of interest and the first program information;
extracting genre information included in the program information of the program of interest;
searching for second program information having the genre information from the information storage unit;
calculating a genre similarity between the program information of the program of interest and the second program information;
presenting the first program information based on the reduced phrase similarity; and presenting the second program information based on the genre similarity.

7. The medium according to claim 6,
wherein a screen is divided into a plurality of areas centering on the program information of the program of interest, the first program information is displayed on a first area of the screen, and the second program information is displayed on a second area of the screen which is different from the first area of the screen, the first program information having a high phrase similarity is arranged at a position close to the program information of the program of interest, and the second program information having a high genre similarity is arranged at a position close to the program information of the program of interest.

8. A similar content search method comprising:
acquiring a plurality of program information including description information and genre information of a content;

storing the plurality of program information in an information storage unit;

receiving a designation of a program of interest;

acquiring program information of the program of interest from the information storage unit;

extracting a phrase from description information included in the program information of the program of interest;

searching for first program information having the phrase from the information storage unit;

calculating a phrase similarity between the program information of the program of interest and the first program information;

reducing the phrase similarity when a phrase stored in a genre characteristic word storage unit that stores a combination of a genre and a phrase characteristic of the genre is included in the program information of the program of interest and the first program information and the genre combined with the phrase is included in the program information of the program of interest and the first program information;

extracting genre information included in the program information of the program of interest;

searching for second program information having the genre information from the information storage unit;

calculating a genre similarity between the program information of the program of interest and the second program information;

presenting the first program information based on the reduced phrase similarity; and presenting the second program information based on the genre similarity.

9. The method according to claim 8,
wherein a screen is divided into a plurality of areas centering on the program information of the program of interest, the first program information is displayed on a first area of the screen, and the second program information is displayed on a second area of the screen which is different from the first area of the screen, the first program information having a high phrase similarity is arranged at a position close to the program information of the program of interest, and the second program information having a high genre similarity is arranged at a position close to the program information of the program of interest.

\* \* \* \* \*